(12) United States Patent
Fan et al.

(10) Patent No.: US 9,105,124 B2
(45) Date of Patent: Aug. 11, 2015

(54) METHODS AND SYSTEMS FOR REDUCING NOISE- RELATED IMAGING ARTIFACTS

(75) Inventors: Jiahua Fan, New Berlin, WI (US);
Yunzhe Zhao, Irvine, WI (US);
Guangzhi Cao, Madison, WI (US)

(73) Assignee: General Electric Company, Schenectady, NY (US)

( * ) Notice: Subject to any disclaimer, the term of this patent is extended or adjusted under 35 U.S.C. 154(b) by 467 days.

(21) Appl. No.: 13/529,002

(22) Filed: Jun. 21, 2012

(65) Prior Publication Data

US 2013/0343623 A1    Dec. 26, 2013

(51) Int. Cl.
G06K 9/40     (2006.01)
G06T 11/00    (2006.01)
G06T 5/00     (2006.01)

(52) U.S. Cl.
CPC .............. *G06T 11/005* (2013.01); *G06T 5/002* (2013.01); *G06T 2207/10081* (2013.01)

(58) Field of Classification Search
None
See application file for complete search history.

(56) References Cited

U.S. PATENT DOCUMENTS

| 5,744,802 | A  | * | 4/1998 | Muehllehner et al. ... 250/363.03 |
| 7,221,728 | B2 |   | 5/2007 | Edic et al. |
| 7,583,730 | B2 |   | 9/2009 | Wu et al. |
| 8,175,115 | B2 |   | 5/2012 | Thibault et al. |
| 2008/0095300 | A1 |   | 4/2008 | Zingelewicz et al. |
| 2011/0097007 | A1 |   | 4/2011 | Zeng et al. |
| 2011/0150305 | A1 |   | 6/2011 | Zeng et al. |
| 2011/0262054 | A1 |   | 10/2011 | Benson et al. |
| 2011/0268328 | A1 | * | 11/2011 | Bar-Aviv et al. ............... 382/128 |
| 2013/0089252 | A1 | * | 4/2013 | Shechter ......................... 382/131 |
| 2013/0208971 | A1 | * | 8/2013 | Brown et al. .................. 382/131 |
| 2014/0140601 | A1 | * | 5/2014 | Litvin et al. ................... 382/131 |

FOREIGN PATENT DOCUMENTS

| WO | WO 2010073251 | A2 | * | 7/2010 |
| WO | WO 2011161557 | A1 | * | 12/2011 |
| WO | WO 2012056364 | A1 | * | 5/2012 |
| WO | WO 2013002805 | A1 | * | 1/2013 |

\* cited by examiner

*Primary Examiner* — Vikkram Bali
*Assistant Examiner* — Tracy Mangialaschi
(74) *Attorney, Agent, or Firm* — Dean D. Small; The Small Patent Law Group, LLC.

(57) ABSTRACT

A method for reducing noise in a medical diagnostic image includes acquiring an initial three-dimensional (3D) volume of projection data, generating a projection space noise estimate using the 3D volume of projection data, generating an initial 3D volume of image data using the 3D volume of projection data, generating an image space noise estimate using the 3D volume of image data, generating a noise projection estimate using the projection space noise estimate and the image space noise estimate, and reconstructing an image using the generated noise estimate. A system and non-transitory computer readable medium are also described.

18 Claims, 7 Drawing Sheets

METHODS AND SYSTEMS FOR REDUCING NOISE-RELATED IMAGING ARTIFACTS

BACKGROUND OF THE INVENTION

The subject matter disclosed herein relates generally to imaging systems, and more particularly, embodiments relate to methods and systems for reducing noise in images.

Non-invasive imaging broadly encompasses techniques for generating images of the internal structures or regions of a person or object that are otherwise inaccessible for visual inspection. One such imaging technique is known as X-ray computed tomography (CT). CT imaging systems measure the attenuation of X-ray beams that pass through the object from numerous angles (often referred to as projection data). Based upon these measurements, a computer is able to process and reconstruct images of the portions of the object responsible for the radiation attenuation.

During scanning to acquire the projection data, it is desirable to reduce the X-ray dosage received by the subject. One conventional method of reducing the X-ray dosage is reducing the scan time. For example, a length of the scan time may be reduced to minimize the time over which the projections which contribute to the image are acquired. However, reducing the amount of time utilized to acquire the projection data results in fewer projections being acquired and thus fewer measurements contributing to the image reconstruction. Accordingly, information from fewer total measurements is available to reconstruct the final image.

Moreover, reducing the scan time may also result in statistical noise affecting the quality of the projection data. The statistical noise may result in the final image having noise-related imaging artifacts. Conventional imaging systems utilize various techniques to remove the statistical noise and thereby increase the image quality. For example, one conventional de-noising technique utilizes a filter that replaces each pixel by a weighted average of all the pixels in the image. However, the conventional filter requires the computation of the weighting terms for all possible pairs of pixels, making implementation computationally expensive. As a result, a time to generate the final image is increased.

BRIEF DESCRIPTION OF THE INVENTION

In one embodiment, a method for reducing noise in a medical diagnostic image is provided. The method includes acquiring an initial three-dimensional (3D) volume of projection data, generating a projection space noise estimate using the 3D volume of projection data, generating an initial 3D volume of image data using the 3D volume of projection data, generating an image space noise estimate using the 3D volume of image data, generating a noise projection estimate using the projection space noise estimate and the image space noise estimate, and reconstructing an image using the generated noise estimate.

In another embodiment, a medical imaging system is provided. The medical imaging system includes a computer for reducing noise is a medical diagnostic image. The computer is programmed to acquire an initial three-dimensional (3D) volume of projection data, generate a projection space noise estimate using the 3D volume of projection data, generate an initial 3D volume of image data using the 3D volume of projection data, generate an image space noise estimate using the 3D volume of image data, generate a noise projection estimate using the projection space noise estimate and the image space noise estimate, and reconstruct an image using the generated noise estimate.

In a further embodiment, a non-transitory computer readable medium is provided. The non-transitory computer readable medium is programmed to instruct a computer to acquire an initial three-dimensional (3D) volume of projection data, generate a projection space noise estimate using the 3D volume of projection data, generate an initial 3D volume of image data using the 3D volume of projection data, generate an image space noise estimate using the 3D volume of image data, generate a noise projection estimate using the projection space noise estimate and the image space noise estimate, and reconstruct an image using the generated noise estimate.

DETAILED DESCRIPTION OF THE INVENTION

The foregoing summary, as well as the following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Also as used herein, the term "reconstructing" or "rendering" an image or data set is not intended to exclude embodiments in which data representing an image is generated, but a viewable image is not. Therefore, as used herein the term "image" broadly refers to both viewable images and data representing a viewable image. However, many embodiments generate, or are configured to generate, at least one viewable image.

Various embodiments provide systems and methods for reducing noise related imaging artifacts. Specifically, various embodiments provide a method for iteratively reducing noise levels in a reconstructed image. Noise estimates are generated in both projection space and image space. The projection space noise estimates and the image space noise estimates are then minimized in the projection space. A technical effect of at least one embodiment described herein is to reduce noise related imaging artifacts and thus enable improved image quality in images acquired at lower dose levels.

Figure 1:
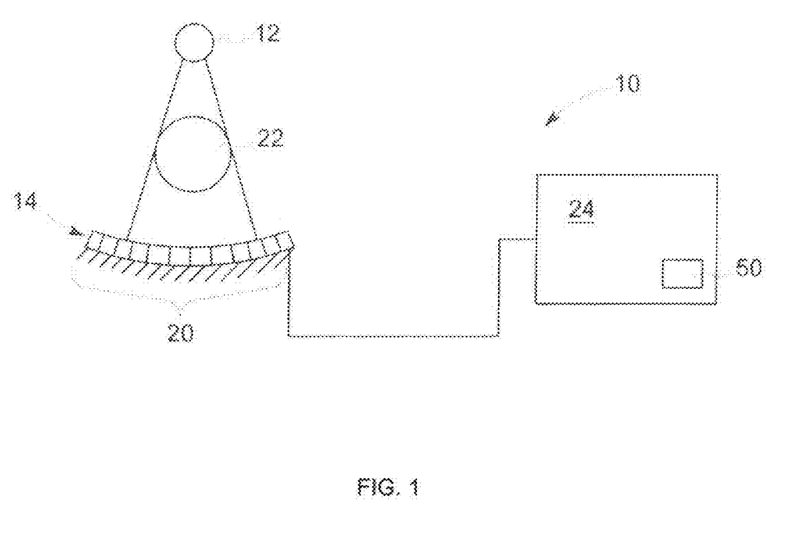
FIG. 1 is a simplified block diagram of an imaging system formed in accordance with various embodiments

FIG. 1 illustrates a simplified block diagram of an exemplary imaging system 10 that is formed in accordance with various embodiments. In the exemplary embodiment, the imaging system 10 is a computed tomography (CT) imaging system that includes an X-ray source 12 and a detector 14. The detector 14 includes a plurality of detector elements 20 that are arranged in rows and channels, that together sense projected X-rays, from the X-ray source 12 that pass through an object, such as a subject 22. Each detector element 20 produces an electrical signal, or output, that represents the intensity of an impinging X-ray beam and hence allows estimation of the attenuation of the beam as the beam passes through the subject 22. The imaging system 10 also includes a computer 24 that receives the projection data from the detector 14, also referred to herein as raw data, and processes the projection data to reconstruct an image of the object 22.

In various embodiments, the imaging system 10 also includes a module 50 that is configured to implement various methods described herein. For example, the module 50 may be programmed to reduce and or eliminate noise-related imaging artifacts that may cause, for example, shading and/or streaking artifacts to occur in a reconstructed image. The module 50 may be implemented as a piece of hardware that is installed in the computer 24. Optionally, the module 50 may be implemented as a set of instructions that are installed on the computer 24. The set of instructions may be stand alone programs, may be incorporated as subroutines in an operating system installed on the computer 24, may be functions in an installed software package on the computer 24, and the like. It should be understood that the various embodiments are not limited to the arrangements and instrumentality shown in the drawings.

Figure 2:
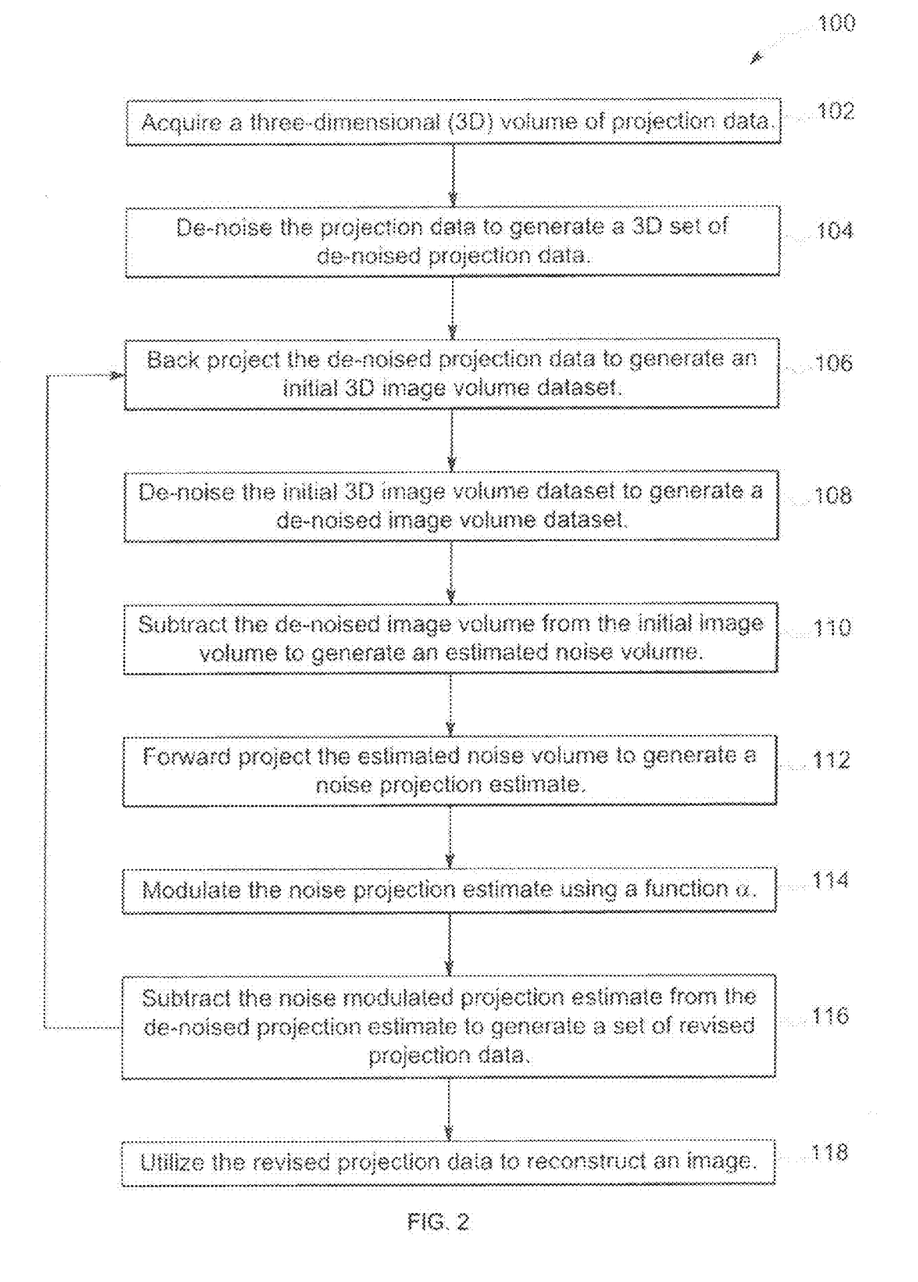
FIG. 2 is a flowchart of a method for reconstructing an image of an object in accordance with various embodiments.
Figure 3:
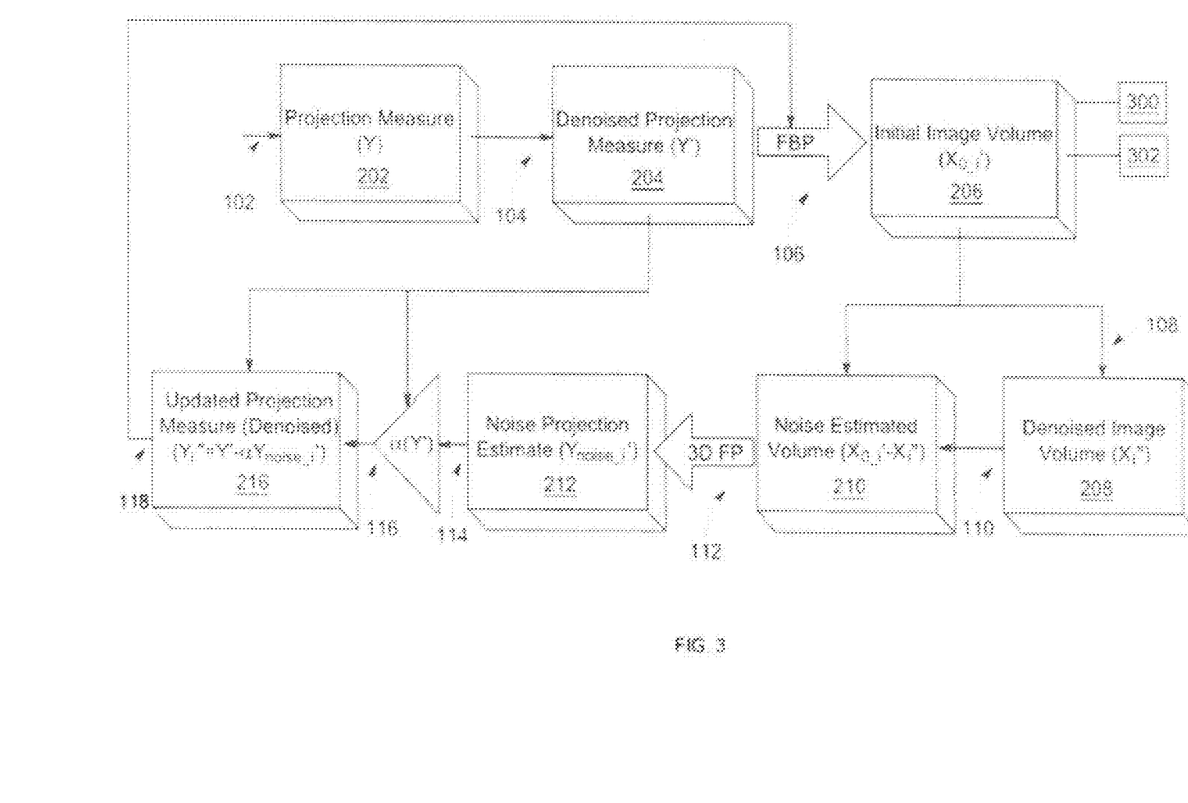
FIG. 3 is a block diagram of information that may be generated using the method shown in FIG. 2.

FIG. 2 is a flowchart of a method 100 for reconstructing an image of an object in accordance with various embodiments. FIG. 3 is a block diagram of information that may be generated during the method 100 shown in FIG. 2. The method 100 may be embodied as an algorithm that is operable to perform the methods described herein. The algorithm may be embodied as a set of instructions that are stored on a computer and implemented using, for example, the module 50, shown in FIG. 1.

Referring to FIG. 2, at 102 a three-dimensional (3D) volume of projection data (Y) 202 is acquired. In various embodiments, to acquire the projection data 202, the subject 22 may be scanned using a full scan technique to generate the set of projection data 202, or projections. Optionally, the subject 22 may be scanned using a partial scan or various other types of scans to acquire the projection data 202. The subject 22 may be scanned, using for example, the CT imaging system 10 shown in FIG. 1 or in FIGS. 10 and 11 which are discussed in more detail below. Optionally, the set of projection data 202 may be acquired using other imaging systems described herein. More specifically, the projection data 202 may be acquired by any X-ray imaging system, such as any diagnostic or clinical CT imaging system. In various other embodiments, the projection data 202 may be acquired from a previous scan of the subject 22 that is stored in, for example, the computer 24.

At 104, the projection data 202 (Y) is de-noised to generate a 3D set of de-noised projection data 204 (Y'). In the exemplary embodiment, de-noising is accomplished in projection space to correct for artifacts and noise that may be introduced by, for example, low flux measurements. In various embodiments, the projection data 202 may be de-noised using, for example, an adaptive filtering technique. One such adaptive filtering technique utilizes a "smoothing" operation. "Smoothing" operations generally involve adjusting the signal detected at one channel based on the detected signal magnitude at the channel and the magnitudes of the detected signals of adjacent channels. Such "smoothing" is performed on a channel by channel basis to eliminate streaking type artifacts. In various other embodiments, the projection data 202 may be de-noised using, for example, a mean-preserving filter (MPF). In operation, the MPF assigns each negative sample a predetermined value while changing the values of the sample's neighbors at the same time to keep the mean values substantially the same. More specifically, the MPF is configured to replace detector samples having a negative value with a predetermined positive value while preserving the local mean value of the remaining detector samples. Accordingly, detector samples having negative values are replaced with a positive value, and the shift caused by this replacement is distributed to the neighboring detector channels, such that no bias will be introduced. It should be realized the other filtering techniques may be utilized to de-noise the projection data 202 and that the filter techniques described herein are exemplary only.

At 106, the de-noised projection data 204 (Y') is utilized to generate an initial 3D image volume or dataset 206 ($X_{0\_i}'$) where i refers to a quantity of de-noising iterations performed by the method 100 as is described in more detail below. In various embodiments, a filtered backprojection technique is applied to the de-noised projection data 204 to generate the initial image volume 206. More specifically, in various embodiments, the X-ray source 12 and the detector array 14 are rotated with a gantry (shown in FIG. 10) within an imaging plane and around the subject 22 to be imaged such that the angle at which an X-ray beam intersects the subject 22 constantly changes. A group of X-ray attenuation measurements, known as projection data, e.g. the projection data 202, from the detector array 14 at one gantry angle is referred to as a view. A scan of the subject 22 generates a set of views made at different gantry angles, or view angles, during one revolution of the X-ray source 12 and the detector 14.

Figure 4:
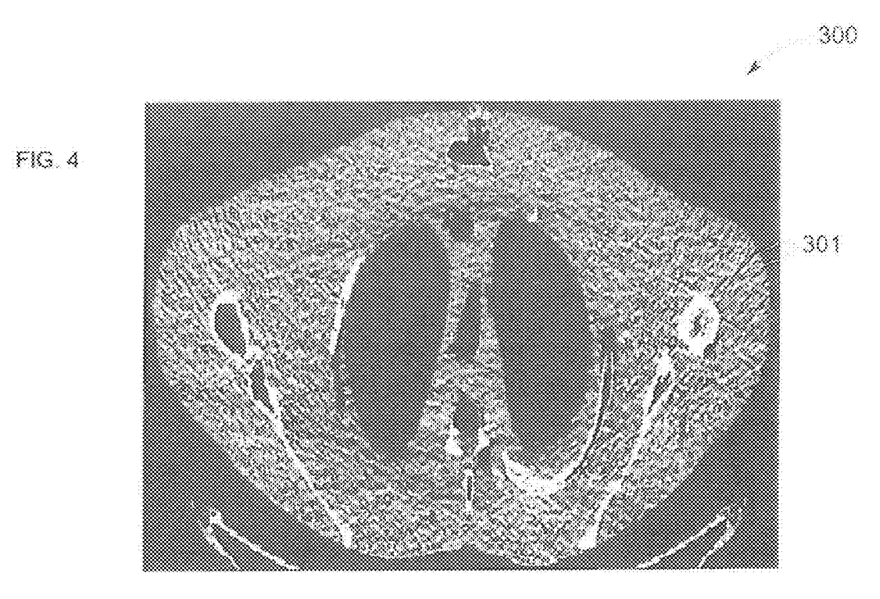
FIG. 4 is an exemplary image that may be generated in accordance with various embodiments.

The projection data 202 is de-noised and then used to reconstruct the initial image volume 206 that represents a plurality of two-dimensional (2D) slices taken through the subject 22. In operation, the filtered backprojection technique converts the attenuation measurements acquired during the patient scan, i.e. the de-noised projection data 204, into integers called CT numbers or Hounsfield Units (HU), which are used to control the brightness of a corresponding pixel that may be used to generate the initial image volume 206 or an initial image being displayed. Accordingly, in various embodiments, the 3D image volume 206 includes image data having an HU value for each of the voxels in the de-noised projection data 204. Accordingly, backprojection as used herein is a method of converting data from a measured projection plane to an image plane. For example, FIG. 4 is an exemplary image 300 that may be generated using the initial image volume 206. As shown in FIG. 4, the image 300 includes various artifacts 301, represented as speckling, that reduce the quality of the image 300.

Accordingly, and referring again to FIG. 2, at 108, the initial image volume 206 is de-noised to generate a de-noised image volume 208 ($X_i''$). It should be realized that because the initial image volume 206 is image space data, then the de-noising operation performed at 208 is performed solely in image space and the resultant de-noised image volume 208 is image space data that has been de-noised. The initial image volume 206 may be de-noised, using for example, a smoothing filter based on local statistics, a multi-frequency band de-noising technique, an isotropic de-noising technique, etc. It should be realized that various techniques may be utilized to de-noise the initial image volume 206 to generate the de-noised image volume 208.

At 110, the initial image volume 206 is subtracted from the de-noised image volume 208 to generate an estimated noise volume 210 ($X_{0\_i}' - X_i''$). Thus, the estimated noise volume 210 is a 3D volume of data that represents the image space noise in the initial image volume 206.

At 112, the estimated noise volume 210, which is image space data, is forward projected to generate a noise projection estimate 212 ($Y_{noise\_i}'$). Forward projection, which may also be referred to herein as reprojection, is a technique wherein image space data is converted to projection space data. For example, the estimated noise volume 210, which is image space data, is converted to the noise projection estimate 212, which is projection space data. In various embodiments, the information in the estimated noise volume 210 is converted from image space to projection space by, for example, integrating the estimated noise volume 210 along a path in image space. Thus, the noise projection estimate 212 is a projection space representation of the noise estimated volume 210. More specifically, the noise estimated volume 210 represents noise in image space. Accordingly, the image space noise is being forward projected at 112 back to projection space, e.g. the noise projection estimate 212.

At 114, the noise projection estimate 212 is modulated by a function α. In various embodiments, the function α. facilitates minimizing a difference between the noise statistics estimated from noise projection estimate 212 ($Y_{noise\_i}'$) and the de-noised projection data 204 (Y'). More specifically, the α function operates as a data matching term, but rather than being applied to the projection data 202 is applied to the noise projection estimate 212. For example, and as described above, the noise is initially measured in image space, the noise is then forward projected back to projection space and wherein the function α is utilized to match the two noise estimates, i.e. the noise estimate from projection space 212 and the noise estimate from image space 210. It should be realized that estimating noise in image space facilitates locating an edge of the object to perform noise reduction. Moreover, estimating noise in projection space may make estimating a variance in the noise easier. Accordingly, the methods described herein take advantage of the benefits of image space de-noising and projection space de-noising to reconstruct an image having reduced noise-related imaging artifacts.

At 116, a set of updated projection or revised projection data 216 ($Y_i''$) is generated. More specifically, the revised projection data 216 is generated by subtracting the modulated noise projection estimate 212 from the de-noised projection data 204. Thus, the revised projection data 216 is a 3D volume of projection data that has been modified to reduce and/or eliminate noise components that may cause various artifacts to occur in a reconstructed image.

Figure 5:
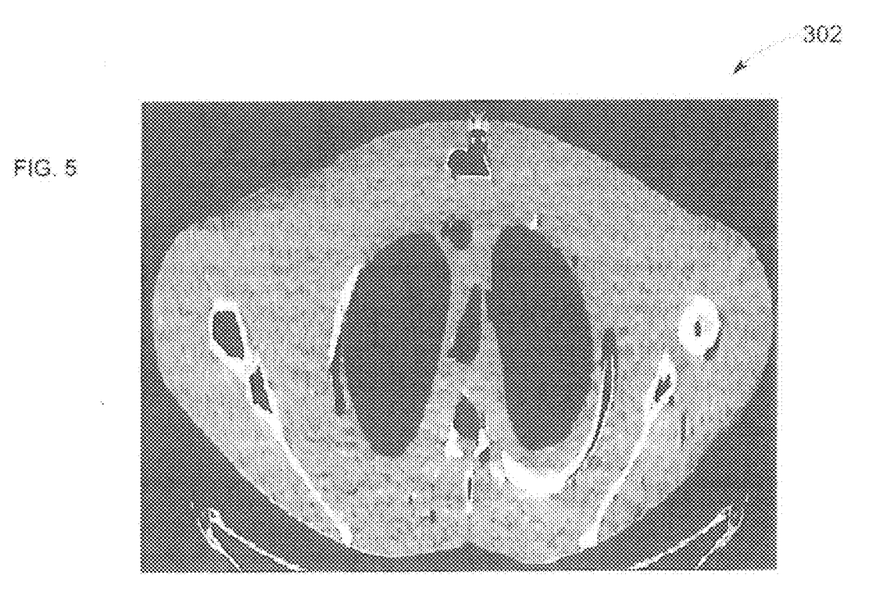
FIG. 5 is another exemplary image that may be generated in accordance with various embodiments.

In various embodiments, at 118, the revised projection data 216 may be utilized to reconstruct a final image. More specifically, and as shown in FIGS. 2 and 3, the filtered backprojection technique is applied to the revised projection data 216 to generate another initial 3D image volume 206' ($X_{0\_i}'$). The revised image volume 206' may then be utilized to reconstruct a final image 302 of the subject 22. For example, FIG. 5 is an exemplary image 302 that may be generated using the updated projection data 216, i.e. after a single iteration of the method is performed. As shown in FIG. 5, a plurality of the noise causing the speckling in FIG. 4 has been removed. Thus, the image 302 has an increased image quality as a result of performing the methods described herein.

In various embodiments, steps 106-118 may be performed iteratively to facilitate further reducing noise, and thus, the noise related imaging artifacts in a reconstructed image. For example, as described above the image 302 illustrates an image that is reconstructed after a single iteration of the method 100. Accordingly, to further increase the image quality of the image 302, the method steps 106-118 may be repeated iteratively. In various embodiments, the steps 106-118 may be iterated based on a manual input received by a user. For example, the user may view the image 302 reconstructed after a single iteration. Based on the operator review, the operator may manually instruct the computer 24 and/or the module 50 to perform a subsequent iteration. In various other embodiments, the computer 24 and/or the module 50 may be programmed to perform a predetermined number of iterations. For example, the operator may instruct the computer 24 to perform five iterations, etc. In various other embodiments, the computer 24 may be programmed to perform continual iterations until the noise projection estimate 212 falls below a predetermined threshold or more specifically, when the α(Y') function falls below a predetermined threshold.

Figure 6:
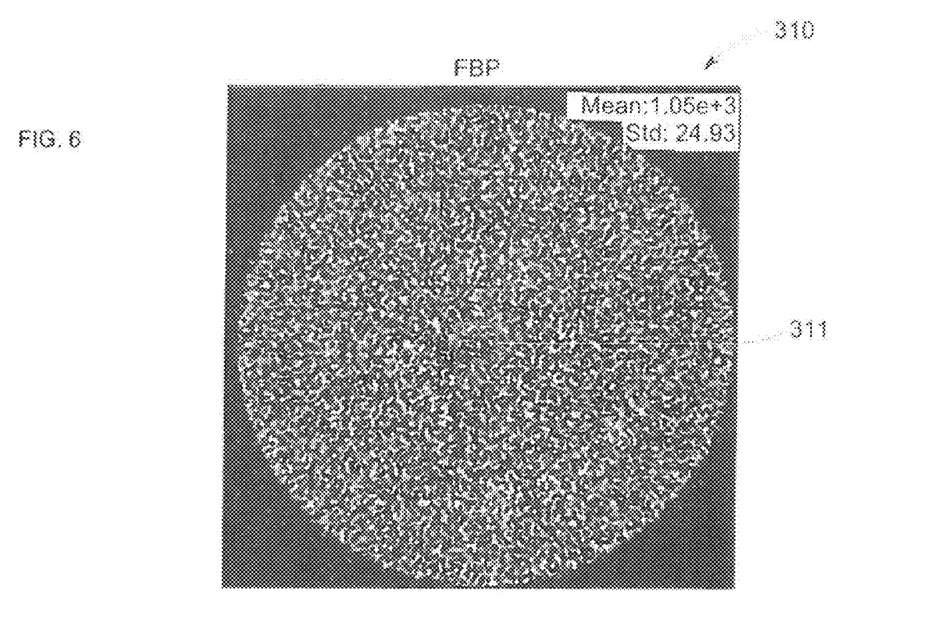
FIG. 6 is another exemplary image that may be generated in accordance with various embodiments.
Figure 7:
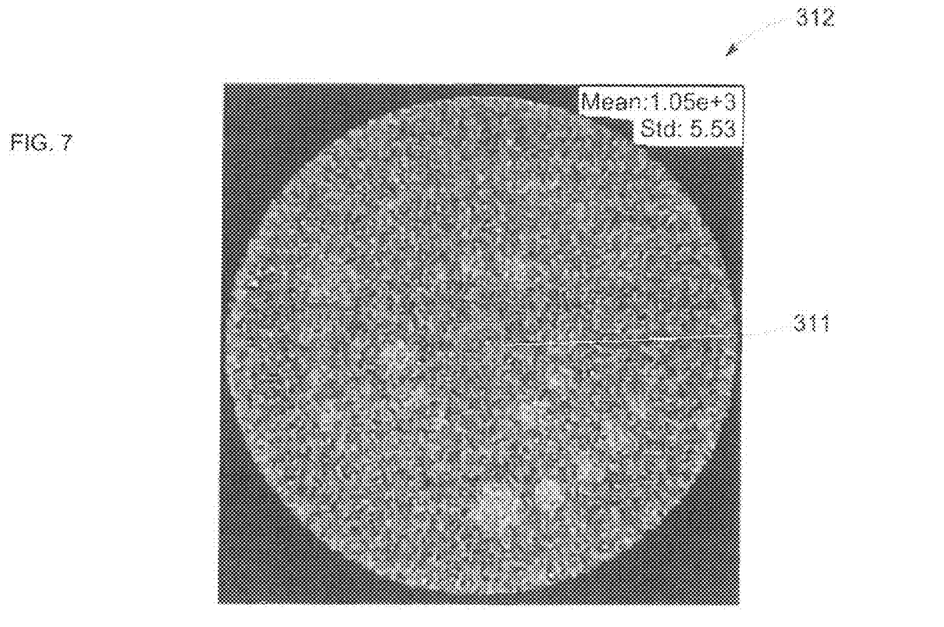
FIG. 7 is another exemplary image that may be generated in accordance with various embodiments.
Figure 8:
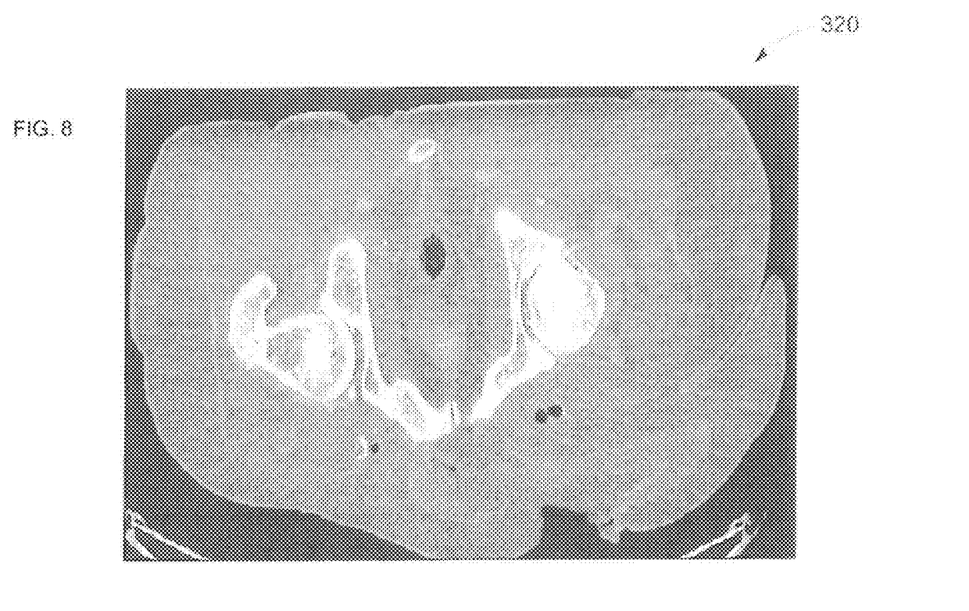
FIG. 8 is another exemplary image that may be generated in accordance with various embodiments.
Figure 9:
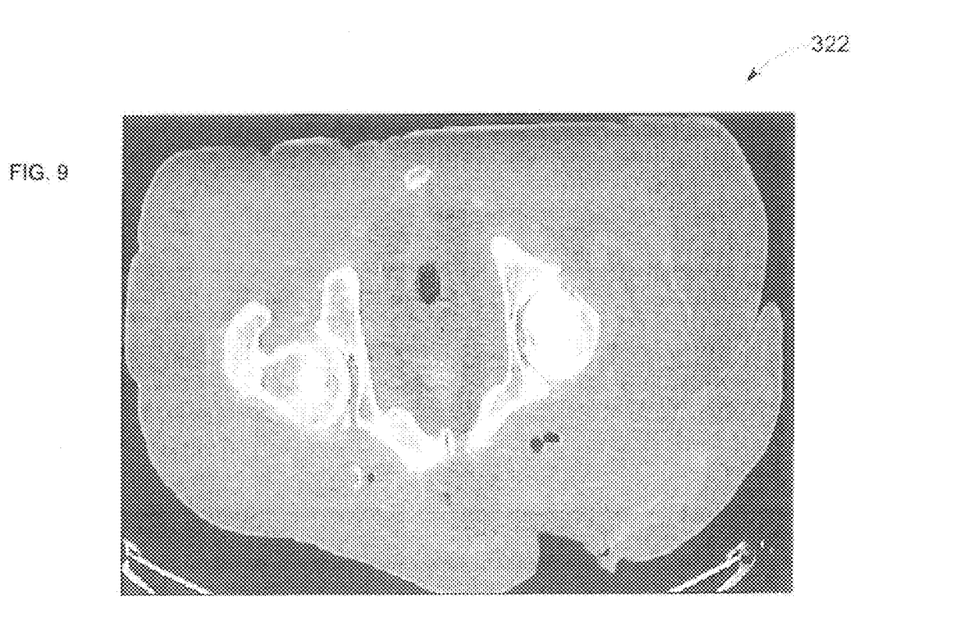
FIG. 9 is still another exemplary image that may be generated in accordance with various embodiments.

Described herein are methods and systems for reducing noise-related imaging artifacts. In operation, noise that is estimated in image space is forward projected back into projection space and compared with a noise estimate that was generated in projection space which is based directly on the raw count data. The methods and systems of various embodiments provide improved image generation speed and also provide improved image quality. For example, FIG. 6 is an exemplary image 310 that may be generated using the initial image volume 206. Moreover, FIG. 7 is an exemplary image 312 that may be generated using the updated projection data 216, i.e. after multiple iterations of the method is performed. As shown, the image 312 in FIG. 7 has increased contrast resolution compared to the image 310 in FIG. 6 as illustrated by the box 311. Additionally, FIG. 8 is an exemplary image 320 that may be generated using the initial image volume 206 wherein a dose level utilized to acquire the image is set to a first level. Moreover, FIG. 9 is an exemplary image 322 that may be generated using the updated projection data 216, i.e. after single iteration of the method is performed at a second dose level that is less than the first dose level. Accordingly, FIG. 9 illustrates that the methods described herein facilitate generating an image using a reduced dose level wherein the quality of the image 322 is substantially the same as the quality of the image 320 which was generated at a higher dose level using conventional de-noising techniques, e.g. the details in the images are similarly reconstructed.

Figure 10:
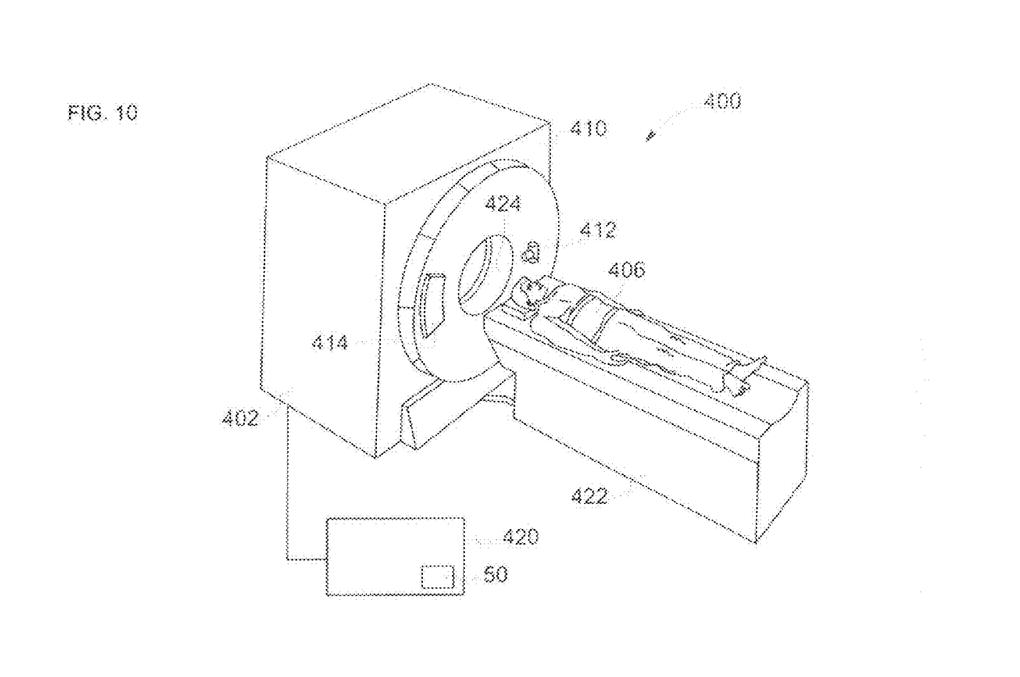
FIG. 10 is a pictorial view of a multi-modality imaging system formed in accordance with various embodiments.
Figure 11:
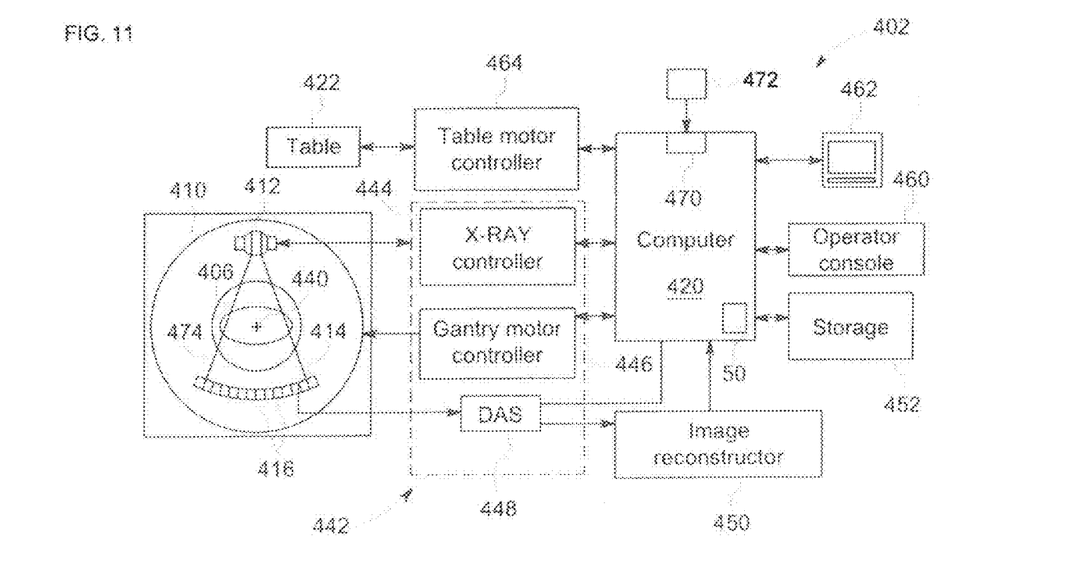
FIG. 11 is a block schematic diagram of the system illustrated in FIG. 10.

The various methods described herein may be implemented using a medical imaging system. For example, FIG. 10 is a pictorial view of a computed tomography (CT) imaging system 400 that is formed in accordance with various embodiments. FIG. 11 is a block schematic diagram of a portion of the CT imaging system 400 shown in FIG. 10. Although the CT imaging system 400 is illustrated as a standalone imaging system, it should be realized that the CT imaging system 400 may form part of a multi-modality imaging system. For example, the multi-modality imaging system may include the CT imaging system and a positron emission tomography (PET) imaging system. It should also be understood that other imaging systems capable of performing the functions described herein are contemplated as being used.

The CT imaging system 400 includes a gantry 410 that has an X-ray source 412 that projects a beam of X-rays toward a detector array 414 on the opposite side of the gantry 410. The detector array 414 includes a plurality of detector elements 416 that are arranged in rows and channels that together sense the projected X-rays that pass through an object, such as the subject 406. The imaging system 400 also includes a computer 420 that receives the projection data from the detector array 414 and processes the projection data to reconstruct an image of the subject 406. In operation, operator supplied commands and parameters are used by the computer 420 to provide control signals and information to reposition a motorized table 422. More specifically, the motorized table 422 is utilized to move the subject 406 into and out of the gantry 410. Particularly, the table 422 moves at least a portion of the subject 406 through a gantry opening 424 that extends through the gantry 410.

As discussed above, the detector 414 includes a plurality of detector elements 416. Each detector element 416 produces an electrical signal, or output, that represents the intensity of an impinging X-ray beam and hence allows estimation of the attenuation of the beam as it passes through the subject 406. During a scan to acquire the X-ray projection data, the gantry 410 and the components mounted thereon rotate about a center of rotation 440. FIG. 11 shows only a single row of detector elements 416 (i.e., a detector row). However, the multislice detector array 414 includes a plurality of parallel detector rows of detector elements 416 such that projection data corresponding to a plurality of slices can be acquired simultaneously during a scan.

Rotation of the gantry 410 and the operation of the X-ray source 412 are governed by a control mechanism 442. The control mechanism 442 includes an X-ray controller 444 that provides power and timing signals to the X-ray source 412 and a gantry motor controller 446 that controls the rotational speed and position of the gantry 410. A data acquisition system (DAS) 448 in the control mechanism 442 samples analog data from detector elements 416 and converts the data to digital signals for subsequent processing. For example, the subsequent processing may include utilizing the module 50 to implement the various methods described herein. An image reconstructor 450 receives the sampled and digitized X-ray data from the DAS 448 and performs high-speed image reconstruction. The reconstructed images are input to the computer 420 that stores the image in a storage device 452. Optionally, the computer 420 may receive the sampled and digitized X-ray data from the DAS 448 and perform various methods described herein using the module 50. The computer 420 also receives commands and scanning parameters from an operator via a console 460 that has a keyboard. An associated visual display unit 462 allows the operator to observe the reconstructed image and other data from computer.

The operator supplied commands and parameters are used by the computer 420 to provide control signals and information to the DAS 448, the X-ray controller 444 and the gantry motor controller 446. In addition, the computer 420 operates a table motor controller 464 that controls the motorized table 422 to position the subject 406 in the gantry 410. Particularly, the table 422 moves at least a portion of the subject 406 through the gantry opening 424 as shown in FIG. 10.

Referring again to FIG. 11, in one embodiment, the computer 420 includes a device 470, for example, a floppy disk drive, CD-ROM drive, DVD drive, magnetic optical disk (MOD) device, or any other digital device including a network connecting device such as an Ethernet device for reading instructions and/or data from a tangible non-transitory computer-readable medium 472, such as a floppy disk, a CD-ROM, a DVD or an other digital source such as a network or the Internet, as well as yet to be developed digital means. In another embodiment, the computer 420 executes instructions stored in firmware (not shown). The computer 420 is programmed to perform functions described herein, and as used herein, the term computer is not limited to just those integrated circuits referred to in the art as computers, but broadly refers to computers, processors, microcontrollers, microcomputers, programmable logic controllers, application specific integrated circuits, and other programmable circuits, and these terms are used interchangeably herein.

In the exemplary embodiment, the X-ray source 412 and the detector array 414 are rotated with the gantry 410 within the imaging plane and around the subject 406 to be imaged such that the angle at which an X-ray beam 474 intersects the subject 406 constantly changes. A group of X-ray attenuation measurements, i.e., projection data, from the detector array 414 at one gantry angle is referred to as a "view". A "scan" of the subject 406 comprises a set of views made at different gantry angles, or view angles, during one revolution of the X-ray source 412 and the detector 414. In a CT scan, the projection data is processed to reconstruct an image that corresponds to a three-dimensional volume taken in the subject 406.

Exemplary embodiments of a multi-modality imaging system are described above in detail. The multi-modality imaging system components illustrated are not limited to the specific embodiments described herein, but rather, components of each multi-modality imaging system may be utilized independently and separately from other components described herein. For example, the multi-modality imaging system components described above may also be used in combination with other imaging systems.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc., are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A method for reducing noise in a medical diagnostic image, said method comprising:
   acquiring an initial three-dimensional (3D) volume of projection data;
   de-noising the initial 3D volume of projection data to generate a 3D set of de-noised projection data;
   generating an initial 3D volume of image data using the 3D set of de-noised projection data;
   generating a de-noised image volume using the initial 3D volume of image data;
   generating an estimated noise volume in image space using the initial 3D volume of image data and the de-noised image volume;
   forward projecting the estimated noise volume to provide a noise projection estimate;
   generating a set of revised projection data using the noise projection estimate and the 3D set of de-noised projection data; and
   reconstructing the image using the set of revised projection data.

2. The method of claim 1, wherein generating the set of revised projection data comprises subtracting the noise projection estimate from the set of de-noised projection data.

3. The method of claim 2, wherein generating the estimated noise volume comprises subtracting the de-noised image volume from the initial image volume.

4. The method of claim 2, further comprising iteratively generating revised noise volumes, projecting the revised noise volumes into projection space and using the revised noise volumes in projection space to revise projection data used to generate the revised noise volumes.

5. The method of claim 1, further comprising:
   modulating the noise projection estimate to generate a revised noise projection estimate; and
   reconstructing the image using the revised noise projection estimate.

6. The method of claim 1, further comprising iteratively generating an image space noise estimate until the image space noise estimate is below a predetermined threshold.

7. The method of claim 1, wherein acquiring the initial (3D) volume of projection data further comprises acquiring a (3D) volume of computed tomography projection data.

8. A medical imaging system comprising:
   a computer for reducing noise in a medical diagnostic image, said computer is programmed to:
   acquire an initial three-dimensional (3D) volume of projection data;
   de-noise the initial 3D volume of projection data to generate a 3D set of de-noised projection data;
   generate an initial 3D volume of image data using the 3D set of de-noised projection data;
   generate a de-noised image volume using the initial 3D volume of image data;
   generate an estimated noise volume in image space using the initial 3D volume of image data and the de-noised image volume;
   forward project the estimated noise volume to provide a noise projection estimate;
   generate a set of revised projection data using the noise projection estimate and the 3D set of de-noised projection data; and
   reconstruct the image using the set of revised projection data.

9. A medical imaging system in accordance with claim 8, wherein the computer is further programmed to generate the set of revised projection data by subtracting the noise projection estimate from the set of de-noised projection data.

10. A medical imaging system in accordance with claim 9, wherein the computer is further programmed to subtract the de-noised image volume from the initial image volume to generate the estimated noise volume.

11. A medical imaging system in accordance with claim 9, wherein the computer is further programmed to iteratively generate revised noise volumes, project the revised noise volumes into projection space, and use the revised noise volumes in projection space to revise projection data used to generate the revised noise volumes.

12. A medical imaging system in accordance with claim 8, wherein the computer is further programmed to:
   modulate the noise projection estimate to generate a revised noise projection estimate; and
   reconstruct the image using the revised noise projection estimate.

13. A medical imaging system in accordance with claim 8, wherein the computer is further programmed to iteratively generate an image space noise estimate until the image space noise estimate is below a predetermined threshold.

14. A medical imaging system in accordance with claim 8, wherein the computer is further programmed to acquire a (3D) volume of computed tomography projection data.

15. A non-transitory computer readable medium for reducing noise in a medical diagnostic image, the non-transitory computer readable medium being programmed to instruct a computer to:
   acquire an initial three-dimensional (3D) volume of projection data;
   de-noise the initial 3D volume of projection data to generate a 3D set of de-noised projection data;
   generate an initial 3D volume of image data using the 3D set of de-noised projection data;
   generate a de-noised image volume using the initial 3D volume of image data;
   generate an estimated noise volume in image space using the initial 3D volume of image data and the de-noised image volume;

forward project the estimated noise volume to provide a noise projection estimate;
generate a set of revised projection data using the noise projection estimate and the 3D set of de-noised projection data; and
reconstruct the image using the set of revised projection data.

16. The non-transitory computer readable medium of claim 15, wherein the program further instructs the computer to generate the set of revised projection data by subtracting the noise projection estimate from the set of de-noised projection data.

17. The non-transitory computer readable medium of claim 16, wherein the program further instructs the computer to subtract the de-noised image volume from the initial image volume to generate the estimated noise volume.

18. The non-transitory computer readable medium of claim 16, wherein the program further instructs the computer to iteratively generate revised noise volumes, project the revised noise volumes into projection space, and use the revised noise volumes in projection space to revise projection data used to generate the revised noise volumes.

* * * * *